(12) United States Patent
Dudar (10) Patent No.: US 11,572,268 B1
(45) Date of Patent: Feb. 7, 2023

(54) BUFFERED REFUELING SYSTEM

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/470,192

(22) Filed: Sep. 9, 2021

(51) Int. Cl.
  *B67D 7/34* (2010.01)
  *B67D 7/04* (2010.01)

(52) U.S. Cl.
  CPC ............ *B67D 7/344* (2013.01); *B67D 7/04* (2013.01)

(58) Field of Classification Search
  CPC ... B67D 7/04; B67D 7/344; B67D 2007/0453
  See application file for complete search history.

(56) References Cited

U.S. PATENT DOCUMENTS

| | | | |
|---|---|---|---|
| 6,390,151 B1 * | 5/2002 | Christman | G06Q 50/06 705/413 |
| 7,428,895 B2 | 9/2008 | Leone et al. | |
| 9,067,487 B2 * | 6/2015 | Zia | B60K 15/05 |
| 9,284,924 B2 | 3/2016 | Dudar et al. | |
| 9,530,290 B2 * | 12/2016 | Hutchinson | G08B 5/36 |
| 9,881,432 B2 * | 1/2018 | McQuade | H04N 7/183 |
| 9,969,265 B2 * | 5/2018 | Williams | B60C 9/00 |
| 10,207,912 B2 * | 2/2019 | Nelson | B67D 7/348 |
| 10,507,726 B2 * | 12/2019 | Yang | B60K 15/05 |
| 10,766,757 B2 * | 9/2020 | Dudar | B60Q 1/2665 |
| 10,893,555 B1 * | 1/2021 | Han | B60L 53/665 |
| 11,124,408 B2 * | 9/2021 | Martin | B60K 15/035 |
| 2017/0221116 A1 * | 8/2017 | Makke | G06Q 30/0609 |
| 2018/0029869 A1 * | 2/2018 | Carapelli | G06Q 20/18 |
| 2019/0330046 A1 * | 10/2019 | Valdhorn | H04N 7/18 |

FOREIGN PATENT DOCUMENTS

CN        105666502 B        7/2018

* cited by examiner

*Primary Examiner* — Timothy L Maust
(74) *Attorney, Agent, or Firm* — Vincent Mastrogiacomo; Brooks Kushman P.C.

(57) ABSTRACT

A refueling system has a fuel tank, a sealing member, a camera, and a controller. The fuel tank includes a main chamber. The sealing member is disposed between the main chamber and the atmosphere. The sealing member is configured to selectively move between a first position in which the fluid communication between the fuel tank and atmosphere is allowed and a second position in which fluid communication with atmosphere is inhibited. The camera is configured to retrieve an image of a fuel source within a predetermined proximity of the fuel tank. The controller is configured to actuate the sealing member in response to an evaluation of the image determining that fuel from the fuel source is consumable with the fuel tank.

2 Claims, 5 Drawing Sheets

BUFFERED REFUELING SYSTEM

TECHNICAL FIELD

The present disclosure relates to systems and methods for refueling a vehicle.

BACKGROUND

Many refueling stations have pumps that dispense various types of fuel. For example, a fuel pump may dispense either diesel or unleaded. However, many vehicles and fuel tanks of vehicle are only configured to receive a single type of fuel. As such, in light of human error, a vehicle may be susceptible to receive the wrong fuel while refueling. To reduce the effect of human error, may refueling stations have color coded refueling pumps. Additionally, many vehicles now employ cameras to assist and facilitate various tasks such as parking.

SUMMARY

Presented are systems and methods to reduce error of refueling a vehicle.

One embodiment may be a refueling system. The refueling system may include a main chamber, a sealing member, a camera, and a controller. The main chamber may define an aperture. The sealing member may be disposed between the main chamber and atmosphere. The sealing member may be configured to selectively move between a first position, which allows fluid communication between the fuel tank and atmosphere and a second position which inhibits fluid communication with atmosphere. The camera may be configured to capture an image of a fuel source within a predetermined proximity of the fuel tank. The controller may be configured to actuate the sealing member to enable the sealing member to move from the second position to the first position in response to an evaluation of the image determining that fuel from the fuel source is usable with the fuel tank.

A second embodiment may be a refueling method. The refueling method may comprise actuating a sealing member disposed between atmosphere and a main chamber of a fuel tank that is in fluid communication with an engine to enable movement between a closed position and an open position and selectively allow fluid communication between the main chamber and atmosphere in response to an evaluation from a camera that a fuel source is configured to provide fuel usable by the engine.

A third embodiment may be a refueling system. The refueling system may comprise a fuel tank including a main chamber in fluid communication with an engine, a closure, and a controller. The closure may be disposed between the main chamber and atmosphere and be selectively enabled to move between a first position and a second position. When the closure is in the first position, fluid communication between the fuel tank and atmosphere is permitted and when the closure is in the second position, fluid communication between the fuel tank and atmosphere is prevented. The controller may be configured to be in communication with the closure and configured to enable the closure to move from the second position to the first position in response to an evaluation that fuel from the fuel source is consumable by the engine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
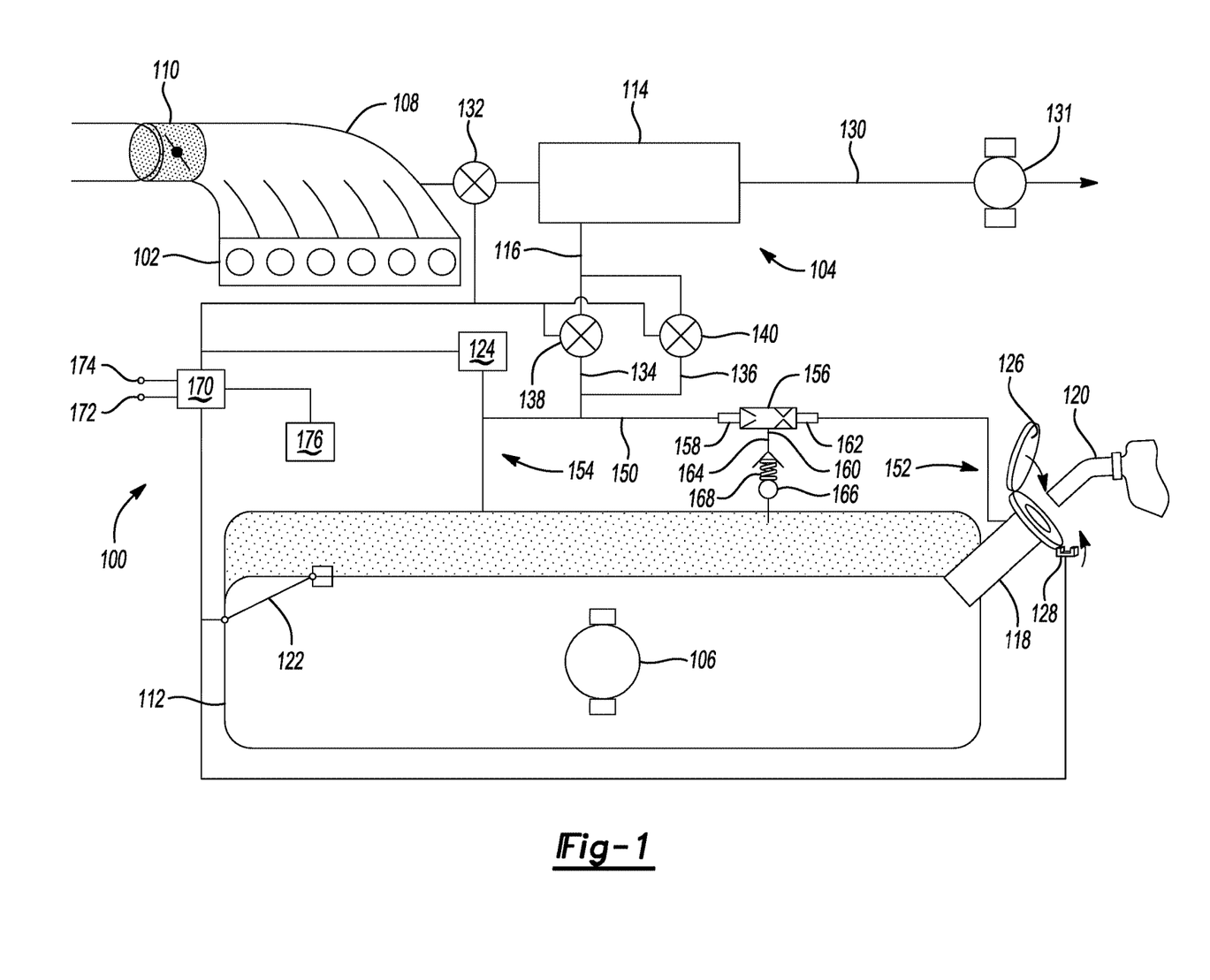
FIG. 1 illustrates a sealed fuel tank.

FIG. 1 illustrates a fuel system 100 for a vehicle. The vehicle may be a conventional vehicle, or may be a hybrid vehicle powered by both an internal combustion engine as well as another propulsion source such as an electric motor. The fuel system 100 delivers fuel to an internal combustion engine 102, and is also provided with an evaporative emissions system 104. The fuel system 100 to the engine has a fuel pump 106 to pressurize fuel to deliver to the engine 102, and may include a fuel injector system according to one example.

The engine 102 has one or more cylinders, an engine intake manifold 108 and an engine exhaust manifold (not shown). The engine intake 108 has a throttle 110 fluidly coupled to the engine intake manifold.

The fuel system 100 has a fuel storage tank 112. The fuel tank 112 is sized to receive a volume of fuel. The fuel tank may be provided by a single tank, or multiple tanks fluidly connected to one another. In various non-limiting examples, the fuel may be a liquid fuel such as gasoline, diesel, alcohol fuels, a mixture thereof, or the like. As used herein, fluid refers to a substance in its liquid phase state, vapor or gas phase state, or a saturated liquid-vapor mixture.

Vapors generated in the fuel system 100 may be directed to an evaporative emissions system 104. The evaporative emission system 104 has a fuel vapor canister 114 fluidly connected to the fuel tank 112 via a vapor recovery line 116 or vent line 116. The fuel vapor canister 114 is fluidly connected to the engine intake manifold 108 to purge vapors in the canister 114 to the engine 102. The vapor recovery line 116 may include one or more conduits and one or more valves for isolating the fuel tank 112 during certain conditions, as described in further detail below.

The fuel tank 112 in the fuel system 100 may be periodically filled, fueled, refilled or refueled from an external fuel source via a fuel fill inlet 118. The fuel fill inlet 118 has a neck or filler pipe and may be sized to receive a nozzle or other fuel dispensing device of the external fuel source 120. According to various examples, the external fuel source 120 may be a fuel pump at a gas station, a portable gas can or gas tank, or a mobile refueling system such as a refueling vehicle or truck. The fuel system 100 may be provided with a fuel level sensor 122 to indicate the fuel level in the fuel tank 112 to the vehicle operator, e.g. via a fuel gauge or other indicator in a vehicle instrument panel. The fuel tank 112 may additionally be provided with a fuel tank pressure transducer 124 to sense the pressure within the fuel tank, and the transducer 124 may be positioned in the vent line 116.

The fuel fill inlet 118 may be closed via a refueling cap 126 or other closure member. The refueling cap 126 may include a sealing member to seal the cap to the fuel tank 112, and prevent fluids, including vapor from exiting the fuel tank 112 via the fuel fill inlet 118 when the refueling cap 126 is closed. Alternatively, the refueling cap 126 may be provided by a valve, e.g. in a capless fuel tank. The refueling cap 126 or a refueling door may additionally include a refueling lock or refueling locking mechanism 128 with a latch or other element to prevent the refueling cap 126 from being opened or removed, or to prevent an external fuel source nozzle 120 from opening the valve in a capless system. A controller as described below may control the locking mechanism 128 to open or unlock the refueling lock, for example, to limit access to the fuel tank 112, or to prevent an operator from opening the refueling cap 126 when a fuel tank 112 pressure is above a threshold pressure value. The refueling lock mechanism 128 may be actively controlled, e.g. via a solenoid, and is unlocked when the fuel tank 112 pressure is below a threshold pressure value. Alternatively, locking and unlocking of the refueling lock mechanism 128 may be passively controlled via a pressure diaphragm or the like.

The fuel vapor canister 114 of the evaporative emissions system 104 may be filled with an adsorbent material, such as activated carbon, to temporarily trap or retain fuel vapors from the fuel tank 112, e.g. during fueling the fuel tank or during vehicle operation. The fuel vapor canister 114 may include an atmospheric ventilation line 130 between the canister and atmosphere for venting vapors from the canister 114 to atmosphere and/or for drawing fresh outside air into the canister 114.

A canister purge valve (CPV) 132 is positioned between the fuel vapor canister 114 and the intake manifold 108 to control the flow of fuel vapor from the canister 114 into the engine 102. The CPV 132 may be opened during a canister 114 purge process, for diagnostics of the evaporative emissions system 104 and/or fuel system 100, and the like.

Vehicles may be required to have diagnostics to validate the integrity of the fuel system 100, including the evaporative emissions system 104, for potential leaks, and to purge the canister 114 of the evaporative emissions system 104. Generally, the evaporative emissions system 104 is purged when the engine 102 is operating such that the operating engine combusts the fuel vapors.

The ventilation line 116 may include a first conduit 134 and a second conduit 136 arranged for parallel flow between the fuel tank 112 and the canister 114. A tank pressure control (TPC) valve 138 may be positioned within the first conduit 134. A refueling (RF) valve 140 may be positioned within the second conduit 136. Each of the TPC and RF valves 138, 140 may be separately controlled. Furthermore, each of the TPC and RF valves 138, 140 may be normally closed valves. The TPC and RF valves 138, 140 control venting of the fuel tank 112 to the canister 114. The TPC valve 138 may be provided with a smaller orifice or aperture than the RF valve 140.

The fuel tank 112 may be a sealed fuel tank, as is shown in FIG. 1, such that the fuel tank 112 may be at a higher or lower pressure than outside, atmospheric pressure. For example, a sealed fuel tank 112 may reach pressures as high as 30-40 kPa above atmospheric pressure, or 5-10 kPa below atmospheric pressure. The fuel tank 112 pressure may vary from atmospheric pressure based on diurnal temperature cycles. For a sealed fuel tank 112, the tank walls may be formed from a metal or other structural material to withstand pressure changes within the fuel tank. The fuel tank 112 therefore contains any vaporized fuel during vehicle operation or from diurnal temperature changes, and the canister 114 adsorbs fuel vapors from depressurization of the fuel tank 112 and during refueling.

The fuel system 100 also has a recirculation line 150 with a first end 152 and a second end 154. The first end 152 is fluidly connected to the fuel fill inlet 118. The second end 154 is fluidly connected to the fuel tank 112 at a location away from or spaced apart from the fuel fill inlet 118, and furthermore may be fluidly connected to or form a portion of the ventilation line 116. The recirculation line 150 may additionally include one or more vent valves to the fuel tank 112 such as grade vent valve, or the like (not shown).

During fueling of the fuel tank 112, the recirculation line 150 allows for vapor displaced by the increasing liquid fuel in the fuel tank 112 to flow from the second end 154 of the recirculation line 150 to the first end 152 of the recirculation line and back to the fuel fill inlet 118. The vapor recirculation through the recirculation line 150 may reduce air entrainment by fuel flowing into the fuel tank 112 and hence reduce fuel vaporization inside the tank 112. This may allow for a reduction in size of the vapor canister 114 and associated adsorbent material.

The recirculation line 150 may additionally provide a passage directly between the fuel filling inlet 118 and the evaporative emissions system 104, and bypass the fuel tank 112. For a bottom feeding tank, a vapor path between the fuel filling inlet 118 and the evaporative emissions system 104 and canister 114 may become blocked at higher fuel levels within the fuel tank 112, and the recirculation line 150 provides a vapor passage to the fuel filling inlet 118 for diagnostic purposes.

The recirculation line 150 has an ejector 156 positioned within an intermediate location of the recirculation line 150 between the first and second ends 152, 154. The ejector 156 may be positioned within a local low spot or trap in the recirculation line 150, and in one example, is positioned at the lowest point in the recirculation line 150 that is close to the fuel tank 112. The first and second conduits 134, 136 or ventilation line 116 for the evaporative emissions system 104 may be connected to the recirculation line 150 between the second end 154 of the recirculation line and the ejector 156.

The ejector 156 may be provided as a passive vacuum ejector. The ejector 156 has a motive fluid inlet 158 to a primary nozzle, a secondary flow inlet 160, a converging-diverging nozzle, and an outlet 162. During refueling, vapor flow through the recirculation line 150 flows into the motive fluid inlet 158, through the converging-diverging nozzle, and through the outlet 162. This flow of vapor through the ejector 156 creates a vacuum on the secondary flow inlet 160 via the Venturi effect to draw in and entrain fluid from the secondary flow inlet 160 into the ejector 156 and converging diverging nozzle.

The converging diverging nozzle within the ejector 156 may replace a fixed orifice that is otherwise provided within the recirculation line 150 to limit vapor flow through the recirculation line 150 and prevent vapor from exiting the fuel filling inlet 118 during refueling such that the recirculation line 150 according to the present disclosure does not have a separate fixed orifice apart from the ejector 156.

The recirculation line 150 includes a drain conduit 164 or drain line. The drain line 164 is connected to the secondary flow inlet 160 of the ejector. A valve 166 is positioned within the drain conduit 164 between the secondary flow inlet 160 to the ejector and the fuel tank 112. The valve 166 is movable between a closed position and an open position, with the closed position preventing flow through the drain line 164. Therefore, the ejector 156 is positioned to draw suction on the valve 166 to maintain the valve 166 in a closed position in response to vapor flow through the recirculation line 150 and the ejector 156 during fueling of the fuel tank 112. By closing the valve 166 during refueling, the recirculation line 150 is not fluidly short circuited by vapor flow through the drain line 164, which would cause a bypass to first end 152 of the recirculation line and the fuel filling inlet 118 and may increase vapor generation during refueling.

The valve 166 may be provided as a passive valve, such as a passive check valve. The valve 166 may be a normally closed valve, a normally open valve, or an indeterminate valve.

The valve 166 may further be provided with a biasing member 168, such as a spring. The biasing member 168 may bias the valve 166 towards a closed position by exerting a force on the valve member. When the valve 166 is biased towards the closed position, the suction on the valve 166 as provided by the ejector 156 acts to further increase the force on the valve 166 to maintain the valve in the closed position. The force provided by the biasing member 168 is selected such that it is overcome by the weight of a small volume of liquid fuel on the valve 166, e.g. one cubic centimeter of liquid fuel, to open the valve 166, move the valve 166 to the open position when liquid is present in the ejector 156, or allow the liquid to seep past the valve 166.

Alternatively, the biasing member 168 may bias the valve 166 towards an open position. When the valve 166 is biased towards an open position, the force provided by the biasing member 168 is selected such that it is overcome by suction force in the secondary inlet 160 of the ejector 156 to close the valve 166, or move the valve 166 to the closed position. The valve 166 may further be a normally open valve without a biasing member, with gravity acting on the valve 166 to move it towards an open position, with the ejector 156 drawing vacuum on the valve 166 to close it.

During refueling, vapor is displaced in the fuel tank 112 by the added liquid fuel from the external source 120. This displaced vapor flows into the ventilation line 116 and second end 154 of the recirculation line 150, through the ejector 156, and back through the first end 152 of the recirculation line into the fuel filling inlet 118. The fuel vapor therefore acts as a motive fluid through the ejector 156 and enters via the motive fluid inlet 158, and exits via the outlet 162. The flow of vapor through the ejector 156 draws a vacuum on the secondary inlet 160 and the valve 166, to maintain the valve 166 in a closed position and prevent gas flow through the drain line 164. As the fuel vapor flows into the fuel filling inlet 118 from the recirculation line 150, it may be further entrained by the liquid fuel stream into the fuel tank 112, further enhancing vapor flow through the recirculation line 150.

When fueling the fuel tank 112, the fuel level within the fuel tank 112 may reach the first end 152 or the second end 154 of the recirculation line 150, and furthermore, liquid fuel may be able to enter the recirculation line 150, ventilation line 116, TPC valve 138, RF valve 140, or evaporative emissions system 104. This may occur when refueling the tank 112 on uneven or sloped terrain or may occur when trickle filling the fuel tank 112. Trickle filling the fuel tank 112 is when an operator continues to add fuel to the tank 112 after an automatic cutoff switch causes the external fuel source 120 to stop pumping fuel. When there is liquid fuel within the recirculation line 150 or elsewhere in the evaporative emissions system 104, the liquid may pool or otherwise reach the valve 166 in the drain line 164.

The valve 166 allows for draining any fuel in the TPC or RF valves 138, 140, the evaporative emissions system 104, or recirculation line 150 back into the fuel tank 112. For example, when fueling the vehicle, fuel vapor flows through the recirculation line 150 until the liquid fuel level reaches the first end 152 or second end 154 of the recirculation line 150, and potentially enters the TPC valve 138, RF valve 140, or recirculation line 150, which blocks or stops the flow of vapor through the recirculation line 150. With no flow through the recirculation line 150, there is no flow through the ejector 156, and the ejector 156 stops drawing a vacuum on the secondary inlet 160 and valve 166. At this point, any liquid in the evaporative emissions system 104 (including the TPC valve, RF valve, ventilation line or recirculation line) may drain through the valve 166 and return to the fuel tank 112. For a normally closed valve 166, the biasing member 168 may be selected such that only a small volume of liquid is sufficient to overcome the biasing force and open the valve 166 to drain the liquid. For a normally open or indeterminate valve 166, the liquid may pass through the valve 166 once the ejector stops drawing a vacuum on the valve 166.

Various components of the fuel system 100, evaporative emissions system 104, and engine 102 are in communication with a controller 170 or control system. The controller 170 may be provided as one or more controllers or control modules for the various vehicle components and systems. The controller 170 and control system for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The controller 170 may be in communication with other vehicle sensors, such as the fuel tank pressure transducer 124, the fuel lever sensor 122, an ambient pressure sensor 172, and an ambient temperature/humidity sensor 174. The controller 170 may additionally be configured to receive an input from the vehicle operator via one or more buttons, touch screens, voice commands, etc., via user interface 176. In one example, the controller 170 receives an input for refueling from an operator via a refueling button on the interface 176. In response to the refueling button being actuated, the controller 170 may depressurize the fuel tank 112, and unlock a locking mechanism 128 for a refueling cap 126 or door as described further below.

Figure 2:
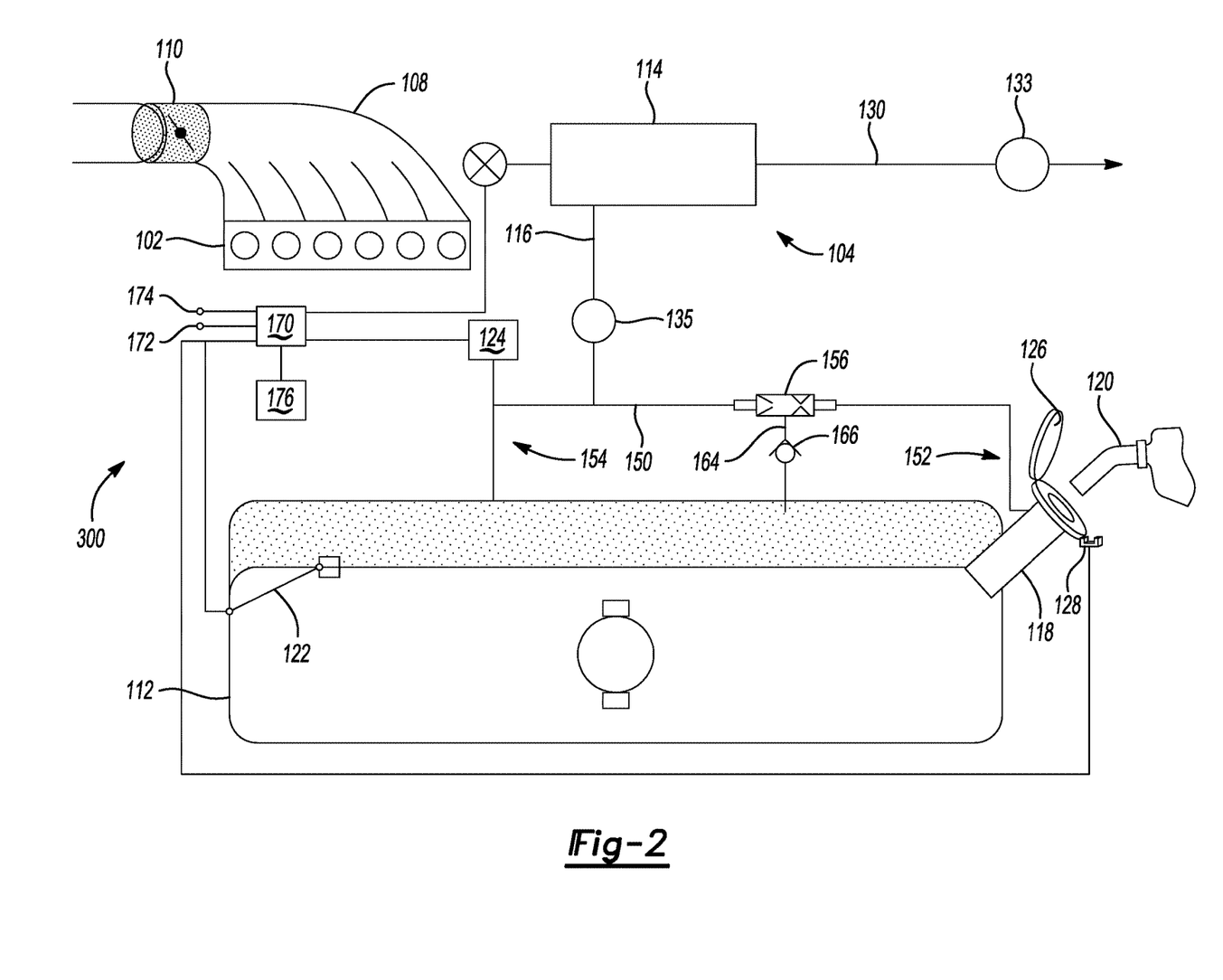
FIG. 2 illustrates a vented fuel tank.

FIG. 2 illustrates a fueling system 200 according to another example. Elements that are the same as or similar to those described above with respect to FIG. 1 are given the same reference number.

In FIG. 2, the fuel tank 112 is not a sealed or pressurized fuel tank, such that the pressure within the fuel tank 112 stays generally close to or within 0.1-1.0 kPa above or below atmospheric pressure. As such the ventilation line 116 between the fuel tank 112 and the canister 114 may be provided without any valve as shown, such that it is an open passage between the canister 114 and the fuel tank 112 or recirculation line 150. In alternative examples, a single valve, such as a fuel tank isolation valve may be positioned within the ventilation line 116 to control fluid flow between the fuel tank 112 and the canister 114.

The recirculation line 150 has an ejector 156 and valve 166 in a drain line 164 as described above with respect to FIG. 1, with the valve 166 draining any liquid fuel in the recirculation line 150, ventilation line 116, or evaporative emissions system 104 to the fuel tank 112.

Figure 3:
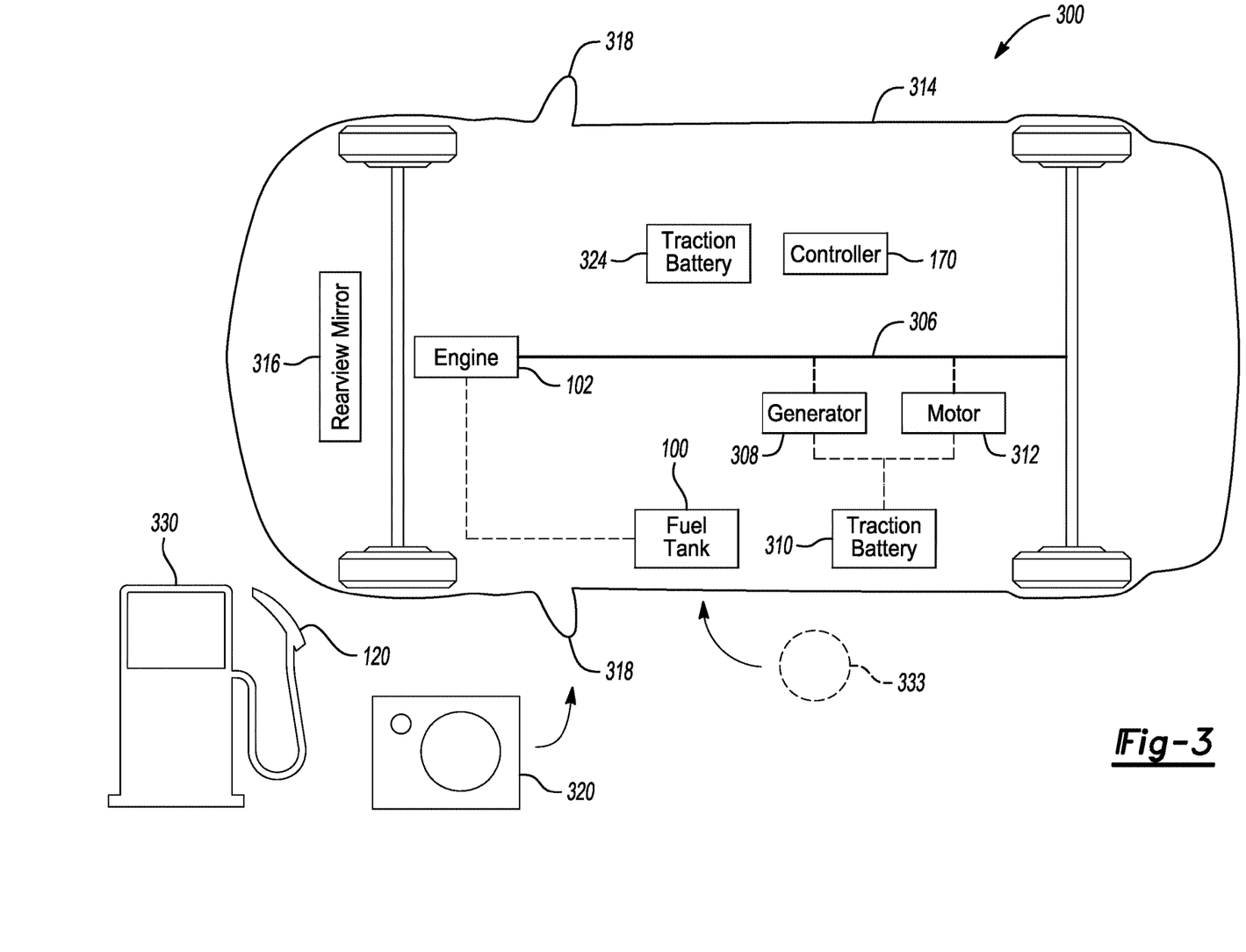
FIG. 3 illustrates a vehicle.

FIG. 3 illustrates a vehicle 300. The vehicle 300 includes an engine 102, a fuel system 100, a vehicle interior 306, a generator 308, a traction battery 310, and a motor 312. The engine 102 may be used to provide torque to a propulsion system within the vehicle 300. The engine 102 may convert chemical energy from a fuel source 120 into mechanical energy. In particular, the engine 102 may provide mechanical energy in the form of rotational energy exerted upon a crankshaft. The engine 102 may be configured to provide the mechanical energy to a transmission through the crankshaft. The engine 102 may be in communication with a vehicle controller 170. The engine 102 may include a plurality of sensors. One of the sensors may determine and provide engine parameters to a vehicle controller 170. For example, an engine sensor may determine and provide engine speed, fuel economy, lubricant level, or other engine parameters. The drivetrain may be in at least one of electrical, magnetic, and mechanical communication with at least one of an internal combustion engine, an electric power source, and a regenerative braking system. In some embodiments, the drivetrain may be in fluid communication with the internal combustion engine 102. For example, the vehicle 300 may have a torque converter between the drivetrain and the internal combustion engine 102. Alternatively, the vehicle 300 may have a clutch between the drivetrain and the internal combustion engine 102.

The vehicle 300 defines a vehicle body 314. The vehicle 300 may have a plurality of mirrors. In at least the depicted embodiment, the vehicle 300 has a rear-view mirror 316 and two side-view mirrors 318. The vehicle may further have a camera 320. The camera 320 may be disposed within at least one of the rear-view mirror 316 and side-view mirrors 318. Moreover, it should be understood that the camera 320 may be disposed elsewhere on the vehicle 300. One of the vehicle body 314 and the fuel system 100 may define an aperture 333 in which fluid communication is provided between the fuel system and atmosphere via the aperture 333. The vehicle 300 may further include a refueling cap 126 sized to generally seal the aperture 333. The vehicle 300 may further comprise a GPS tracking device 324. Many components of the vehicle 300, including the refueling cap 126, are in signal communication with the controller 170. The controller 170 is configured to send commands, receive signals, and execute evaluations from the components of the vehicle. The fuel system 100 is configured to receive fuel to propel the vehicle 300. The fuel system 100 is configured to interact with a fuel source 120 to receive fuel from a fueling station 330. The camera 320 is configured to receive an image of the fuel source 120 and send data correlating to the image to the controller 170. The GPS tracking device 324 may be configured to receive the geographical location of the vehicle 300 and send data correlating to the position to the controller 170 or vehicle 300. The GPS tracking device 324 may further send data correlating to the fuel provided by the fueling station 330 based in part on the georgical location of at least one of the vehicle 300 and the fueling station 330.

The camera 320 may be configured to receive and transmit an image. In some embodiments, the camera 320 may receive an image of a fuel source 120. The image of the fuel source 120 may be a portion of a fuel pump. For example, the portion of the fuel source 120 may be a fuel pump handle. In some embodiments, the camera 320 may be disposed within other locations. For example, the camera 320 may be located within the fueling station 330. In such embodiments, the controller 170 may be configured to receive the image from the camera 320 wirelessly. The camera 320 may be configured to receive an image in which the color of a portion of the fuel pump may be determined. Even further, the camera 320 may further comprise filters upon a camera lens to enhance the color received in the image and/or more easily distinguish the colors within the image. In one embodiment, at least one of the controller 170 and the camera 320 is configured to determine the correct color of a refueling source. Color determination may be based upon at least an electromagnetic wave analyzation. As such, the camera 320 may be configured to receive a range of electromagnetic waves from the electromagnetic spectrum. Even further, the camera 320 may be configured to receive a plurality of electromagnetic waves. Different colors have different frequency spectrum and in at least one embodiment the method uses FFT to analyze the color spectrums to determine the color of the nozzle to determine if the selected fuel is comparable with the engine 102, or in other words consumable or usable by the engine 102. In certain embodiments, the controller 170 is configured to evaluate the quality of an image. The quality of the image may be affected by obstructions between the camera 320 and the fuel source 120, weather, lighting conditions, debris on the camera 320, etc.

The controller 170 is configured to receive and evaluate the image captured by the camera 320. The evaluation may be dependent upon a database in communication with the controller 170. The database may be defined by the controller 170. In certain embodiments, the camera 320 and/or the door independently or in conjunction use pixel analysis around the fuel door region of the image to determine the color spectrum intensity. Additionally, or alternatively, the database may be defined by a communication between the fueling station 330 and the controller 170. In such an embodiment, the controller 170 may be configured to communicate with the fueling station 330 wirelessly. This communication may be a vehicle to station (V2X) transmission between the controller 170 and the fueling station 330. In other embodiments, the fueling station 330 may include a decoding image. The controller 170 may be configured to construct a database based in part on the decoding image. In some embodiments, the camera 320 may be configured to capture the decoding image and transmit a signal indicative of the image to the controller 170.

Figure 4:
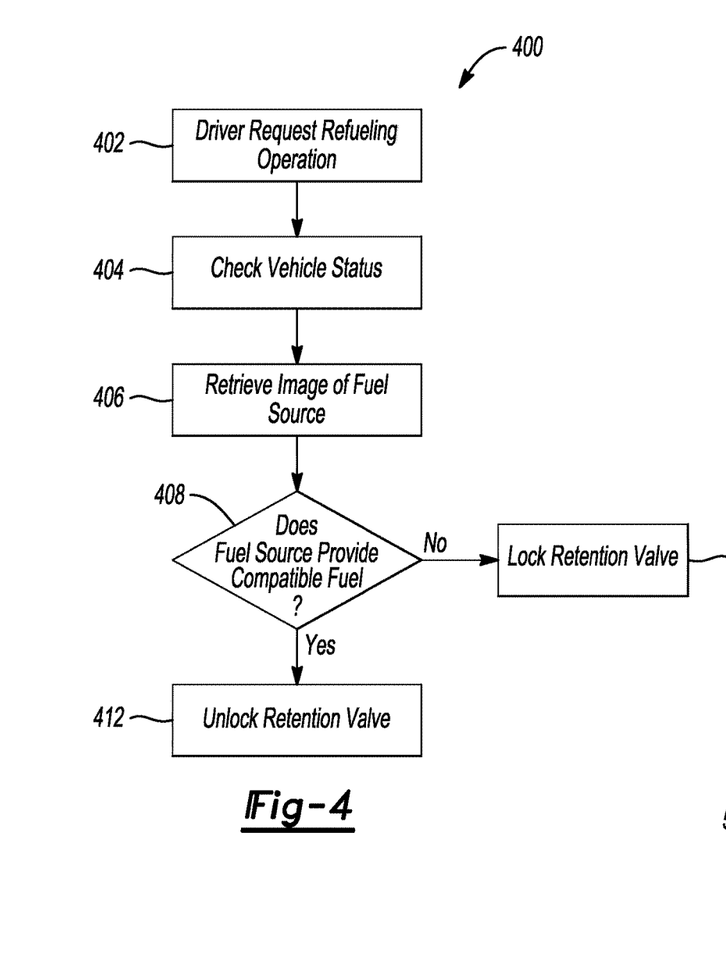
FIG. 4 illustrates a first retention valve method.

FIG. 4 illustrates a first retention valve method 400. The first retention valve method 400 begins with a driver request step 402, in which the controller 170 receives a signal from the driver indicative of a request to refuel the vehicle 300. In this step, the side mirror 318 may be automatically moved for a better view. For instance, the side mirror 318 may be auto-rotated, auto-folded and/or telescoped, in any direction, such as inward or outward from the vehicle, to better view components of the vehicle and/or components of the fueling station 330. In certain embodiments, the camera 320 can zoom in on the region(s) of interest, such as the refueling cap 126 and/or the handle or other portions of the fueling station, such as the fuel source 120. Also, in certain embodiments, the camera 320 can block out portions of the vehicle side body 314. Next in a check vehicle status step 404, the controller 170 determines whether the vehicle is stationary, idle/off and in a position to be refueled.

Next, in a image retrieval step 406, the camera 320 receives an image of the fuel source 120 and/or of the refueling cap 126 region of interest. Further, in an image comparison step 408, the camera 320 sends data corresponding to the image to the controller 170, and makes an evaluation of the compatibility of the fuel source. In one embodiment, the controller 170 evaluates whether the selected fuel is consumable or usable by the engine 102. The evaluation may be dependent upon a database in communication with the controller 170.

Upon a determination that the fuel is consumable with the engine 102, and by extension the fuel system 100, the controller 170 sends a signal to the locking mechanism 128 and/or one or more of the valve(s) 138, 140, or 135 to move the locking mechanism 128 and/or one of the retention valve(s) 138, 140, or 135 to an opened position in an unlock step 412. Additionally, or alternatively, upon a determination that the quality of the image is lower than a predetermined quality threshold, the controller 170 sends a signal to the locking mechanism 128 and/or one or more of the valve(s) 138, 140, or 135 to move the locking mechanism 128 and/or one of the retention valve(s) 138, 140, or 135 to an opened position in the unlock step 412. However, if the evaluation determines that the fuel provided by the fuel source 120 is not consumable with the engine 102, the controller 170 either locks and/or maintains the closed position of the one of locking mechanism 128 and/or one of the retention valve(s) 138, 140, or 135. In at least one embodiment, upon a determination that the fuel is not consumable with the engine 102, and by extension the fuel system 100, the controller 170 sends a signal to the locking mechanism 128 and/or one or more of the valve(s) 133, 138, 140, or 135 to move to a closed position in a lock actuation step 410.

Figure 5:
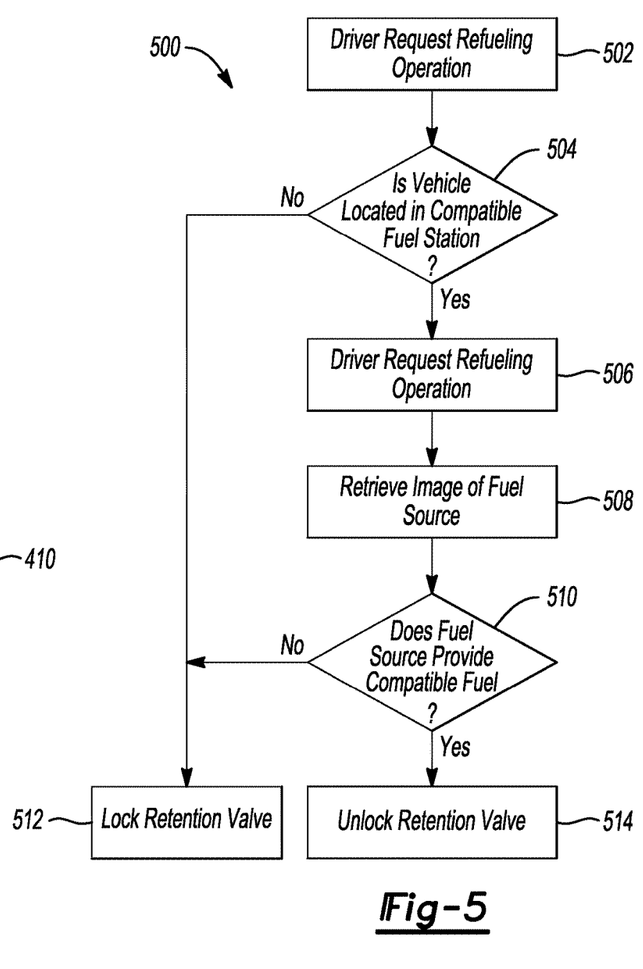
FIG. 5 illustrates a second retention valve method.

FIG. 5 illustrates a second retention valve method 500. The second retention valve method 500 begins with a driver request step 502, in which the controller 170 receives a signal from the driver indicative of a request to refuel the vehicle 300. The following step is a geographic location step 504, in which the controller 170 evaluates the location of the vehicle 300 based at least in part on the GPS tracking device 324. The controller 170 may be configured to determine the compatibility of fuel based at least in part on the GPS location of the vehicle 300 in comparison to the GPS location of the fuel source 120. If the vehicle 300 is in a location incapable of providing consumable fuel to the engine 102, the second retention valve method 500 moves to a lock actuation step 512, locking and/or maintaining the closed position of the locking mechanism 128 closed position of the one of locking mechanism 128 and/or one of the retention valve(s) 138, 140, or 135. If however, the location is capable of providing consumable fuel to the engine 102, the second retention valve method 500 moves to the vehicle status step 506, in which the controller 170 determines whether a vehicle is stationary, idle/off and in a position to be refueled.

Next. in an image retrieval step 508, the camera 320 receives an image of the fuel source 120 and/or of the refueling cap 126 region of interest. Next, in an image comparison step 510, the camera 320 sends data corresponding to the image to the controller 170, and the controller 170 makes an evaluation of the compatibility or usability of the fuel source. The evaluation may be dependent upon a database in communication with the controller 170.

Upon a determination that the fuel is consumable with the engine 102, and by extension the fuel system 100, the controller 170 sends a signal to the locking mechanism 128 and/or one or more of the valve(s) 138, 140, or 135 to move the locking mechanism 128 and/or one of the retention valve(s) 138, 140, or 135 to an opened position in the unlock step 514. Additionally, or alternatively, upon a determination that the quality of the image is lower than a predetermined quality threshold, the controller 170 sends a signal to the locking mechanism 128 and/or one or more of the valve(s) 138, 140, or 135 to move the locking mechanism 128 and/or one of the retention valve(s) 138, 140, or 135 to an opened position in the unlock step 514. However, if the evaluation determines that the fuel provided by the fuel source 120 is not consumable with the fuel system 100, the controller either locks and/or maintains the closed position of the one of locking mechanism 128 and/or one of the retention valve(s) 138, 140, or 135. In at least one embodiment, upon a determination that the fuel is not consumable with the engine 102, and by extension the fuel system 100, the controller 170 sends a signal to the one of locking mechanism 128 and/or one of the retention valve(s) 133, 138, 140, or 135to move to a closed position in the unlock actuation step 512.

Figures 6, 7:
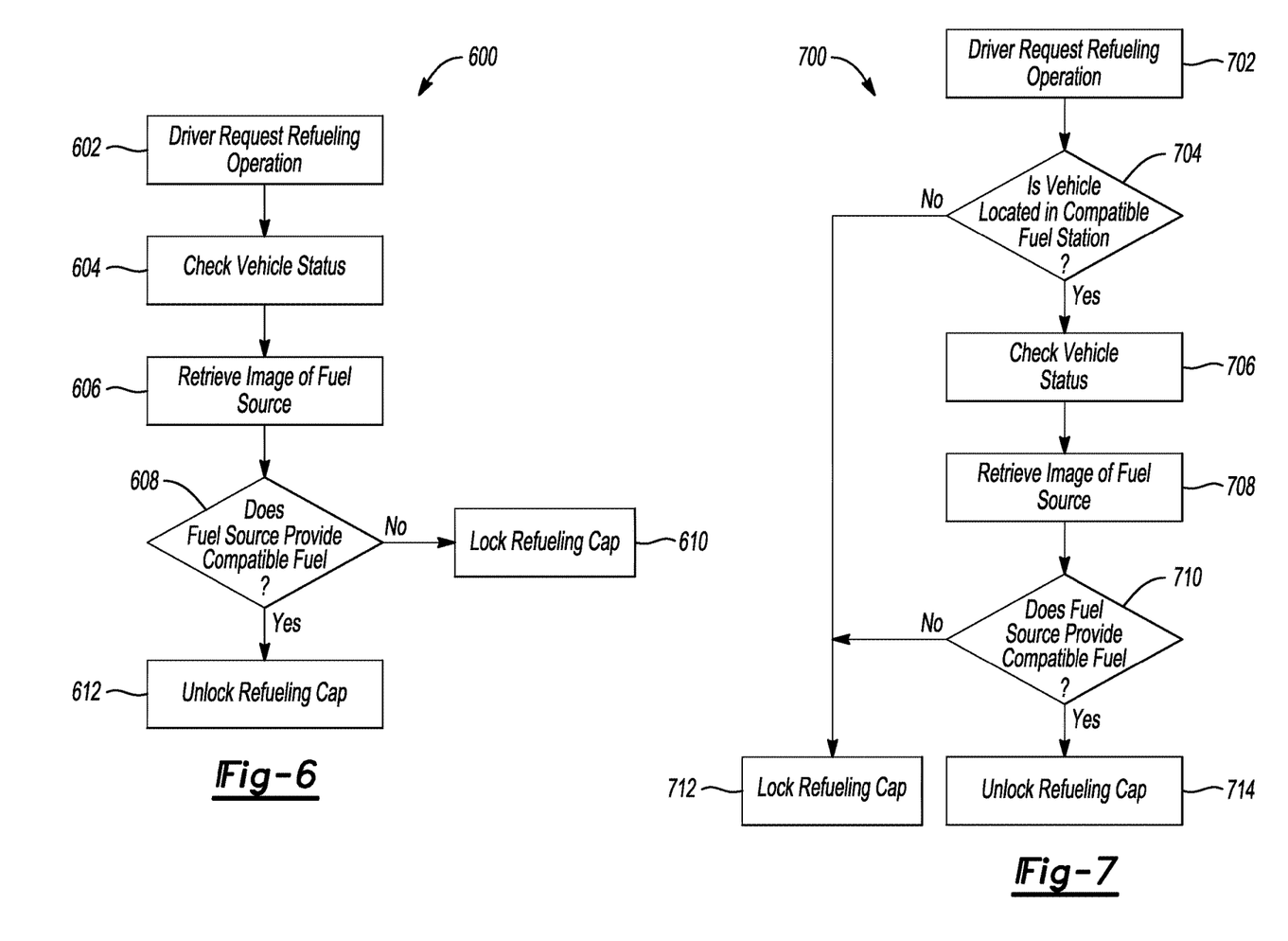
FIG. 6 illustrates a first fuel cap method.
FIG. 7 illustrates a second fuel cap method.

FIG. 6 illustrates a first fuel cap method 600. The first fuel cap method 600 begins with a driver request step 602, in which the controller 170 receives a signal from the driver indicative of a request to refuel the vehicle 300. In this step, the side mirror 318 may be automatically moved for a better view. For instance, the side mirror 318 may be auto-rotated, auto-folded and/or telescoped, in any direction, such as inward or outward from the vehicle, to better view components of the vehicle and/or components of the fueling station 330. In certain embodiments, the camera 320 can zoom in on the region(s) of interest, such as the refueling cap 126 and/or the handle or other portions of the fueling station, such as the fuel source 120. Also, in certain embodiments, the camera 320 can block out portions of the vehicle side body 314. Next in a check vehicle status step 604, the controller 170 determines whether a vehicle is stationary, idle/off and in a position to be refueled.

In an image retrieval step 606, the camera 320 receives an image of the fuel source 120 and/or of the refueling cap 126 region of interest. Even further in an image comparison step 608, the camera 320 sends data corresponding to the image to the controller 170, and the controller 170 makes an evaluation of the compatibility of the fuel source. In one embodiment, the controller 170 evaluates whether the selected fuel is consumable or usable by the engine 102. The evaluation may be dependent upon a database in communication with the controller 170.

Upon a determination that the fuel is consumable with the engine 102, and by extension the fuel system 100, the controller 170 sends a signal to the refueling cap 126 to move to an opened position in an unlock refueling cap step 612. Additionally, or alternatively, upon a determination that the quality of the image is lower than a predetermined quality threshold, the controller 170 sends a signal to the refueling cap 126 to move to an opened position in the unlock refueling cap step 612. However, if the evaluation determines that the fuel provided by the fuel source 120 is not consumable with the fuel system 100, the controller one of locks and/or maintains a closed position of the refueling cap 126. In at least one embodiment, upon a determination that the fuel is not consumable with the engine 102, and by extension the fuel system 100, the controller 170 sends a signal to the refueling cap 126 to move to a closed position in the lock actuation step 610.

FIG. 7 illustrates a second fuel cap method 700. The second fuel cap method 700 begins with a driver request step 702, in which the controller 170 receives a signal from the driver indicative of a request to refuel the vehicle 300. The following step is a geographic location step 704, in which the controller 170 evaluates the location of the vehicle 300 based in part on the GPS tracking device 324. The controller 170 may be configured to determine the compatibility of fuel based at least in part on the GPS location of the vehicle 300 in comparison to the GPS location of the fuel source 120. If the vehicle 300 is in a location incapable of providing consumable fuel to the engine 102, the second fuel cap method 700 moves to a cap locking step 712, locking and/or maintaining the closed position of the refueling cap 126. However, if the location is capable of providing consumable fuel to the engine 102, the second fuel cap method 700 moves to a vehicle status step 706, in which the controller 170 determines whether a vehicle is stationary, idle/off and in a position to be refueled.

Next, in an image retrieval step 708, the camera 320 receives an image of the fuel source 120 and/or of the fuel door region of interest. Further in an image comparison step 710, the camera 320 sends data corresponding to the image to the controller 170, and the controller 170 makes an evaluation of the compatibility of the fuel source. The evaluation may be dependent upon a database in communication with the controller 170.

Upon a determination that the fuel is consumable or usable by the engine 102, and by extension the fuel system 100, the controller 170 sends a signal to the refueling cap 126 to move to an opened position in the unlock cap step 714. Additionally, or alternatively, upon a determination that the quality of the image is lower than a predetermined quality threshold, the controller 170 sends a signal to the refueling cap 126 to move to an opened position in the unlock cap step 714. However, if the evaluation determines that the fuel provided by the fuel source 120 is not consumable with the engine 102, the controller 170 one of locks and/or maintains a closed position of the refueling cap 126. In at least one embodiment, upon a determination that the fuel is not consumable with the engine 102, and by extension the fuel system 100, the controller 170 sends a signal to the refueling cap 126 to move to a closed position in the lock actuation step 712.

Various embodiments according to the present disclosure have associated, non-limiting advantages. The ejector in the recirculation line is used to maintain a check valve in a drain line in a closed position, which maintains the continuity of the recirculation line between the first and second ends. The check valve may open when vapor flow through the recirculation line is interrupted to provide a drain path for any liquid fuel in the evaporative emissions system and recirculation line, and to prevent liquid fuel from entering the evaporative emissions system during refueling. The ejector and associated check valve provide a passive system to control vapor flow through the recirculation line, and drainage of any liquid fuel in the recirculation line and evaporative emissions system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A refueling system comprising:
   a fuel tank disposed in a vehicle body, defining an aperture, and including a main chamber in fluid communication with an engine;
   a closure disposed between the main chamber and atmosphere, comprising a fuel lid having a surface configured to seal the aperture and a lock configured to inhibit movement of the fuel lid relative to the vehicle body, and being selectively enabled to move between a first position and a second position, when the closure is in the first position, fluid communication between the fuel tank and atmosphere is permitted and when the closure is in the second position, fluid communication between the fuel tank and atmosphere is prevented;
   a camera configured to receive an image of a fuel source; and
   a controller, in communication with the closure, configured to enable the closure to move from the second position to the first position in response to an evaluation that fuel from a fuel source is consumable by the engine, wherein the evaluation comprises the controller receiving an image from the camera and a determination that the fuel source provides fuel consumable by the engine based on a color in the image of the fuel source, and wherein the controller is configured to unlock the lock upon the determination that the fuel is consumable by the engine.

2. The refueling system of claim 1, wherein the evaluation is based at least in part on a vehicle to station wireless communication between a vehicle station and the controller.

* * * * *